United States Patent
Barsh et al.

[15] 3,673,560
[45] June 27, 1972

[54] VEHICLE ALERTING SYSTEM

[72] Inventors: Max K. Barsh; James N. Edwards, both of Claremont, Calif.

[73] Assignee: Aerojet-General Corporation, El Monte, Calif.

[22] Filed: May 21, 1970

[21] Appl. No.: 39,493

[52] U.S. Cl. ...........................................................340/33
[51] Int. Cl. ......................................................G08g 1/09
[58] Field of Search ...............................................340/32–34

[56] References Cited

UNITED STATES PATENTS

| | | | |
|---|---|---|---|
| 3,293,600 | 12/1966 | Gifft | 340/33 |
| 3,233,217 | 2/1966 | Bost | 340/33 |
| 3,371,278 | 2/1968 | Gelushia et al. | 340/32 X |

*Primary Examiner*—William C. Cooper
*Attorney*—Edward O. Ansell, Arthur Decker and D. Gordon Angus

[57] ABSTRACT

Disclosed is a system for alerting persons in vehicles of the presence in their vicinity of vehicles devoted to responding to emergency situations; the former may be passenger automobiles, buses or other means of public transportation, etc. and the latter may be police cars, fire trucks, ambulances or the like. The system comprises a complete radio station installation in each emergency vehicle and a receiver installation in each passenger vehicle, and both installations may utilize much of the radio equipment already found in such vehicles for other purposes. Thus, in the passenger vehicle, the equipment may comprise an adapter operative to override any normal reception of the car radio to provide an audible and/or visible indication, or a separate indicating receiver of minimum complexity, whereas, in the emergency vehicle, the equipment may comprise a separate modem or one multiplexed to equipment ordinarily serving another function. In the preferred form, the emergency vehicle modem includes a coder-transmitter and a receiver-decoder-indicator both multiplexed to the same antenna, and the passenger vehicle receiver is similar to the receiving equipment of the emergency vehicle.

10 Claims, 4 Drawing Figures

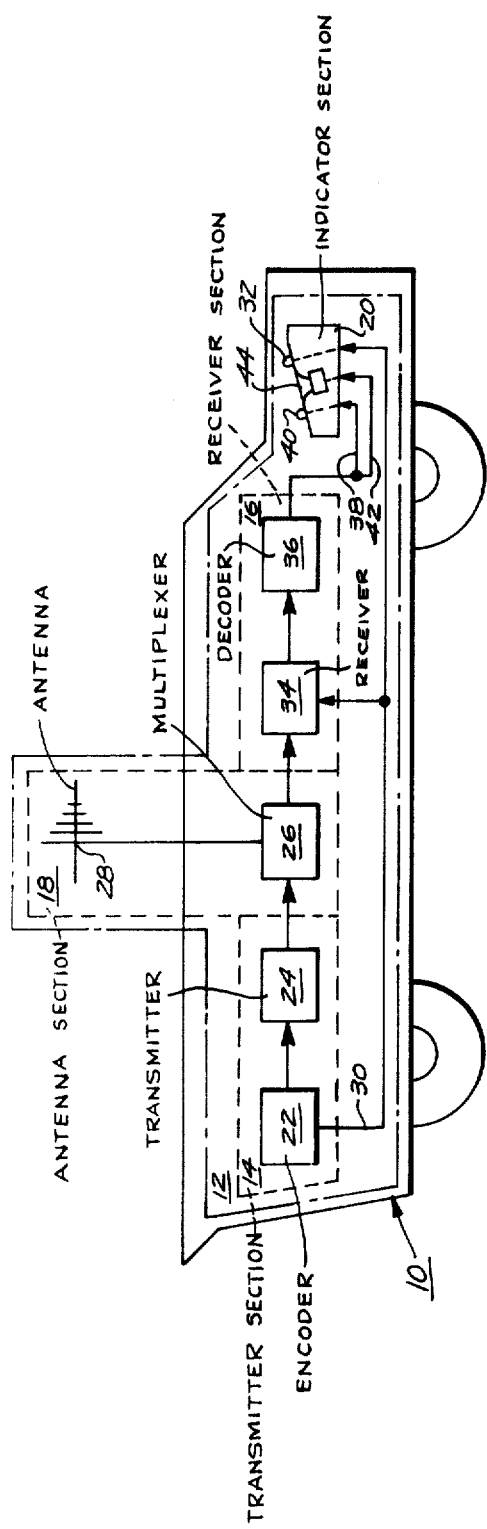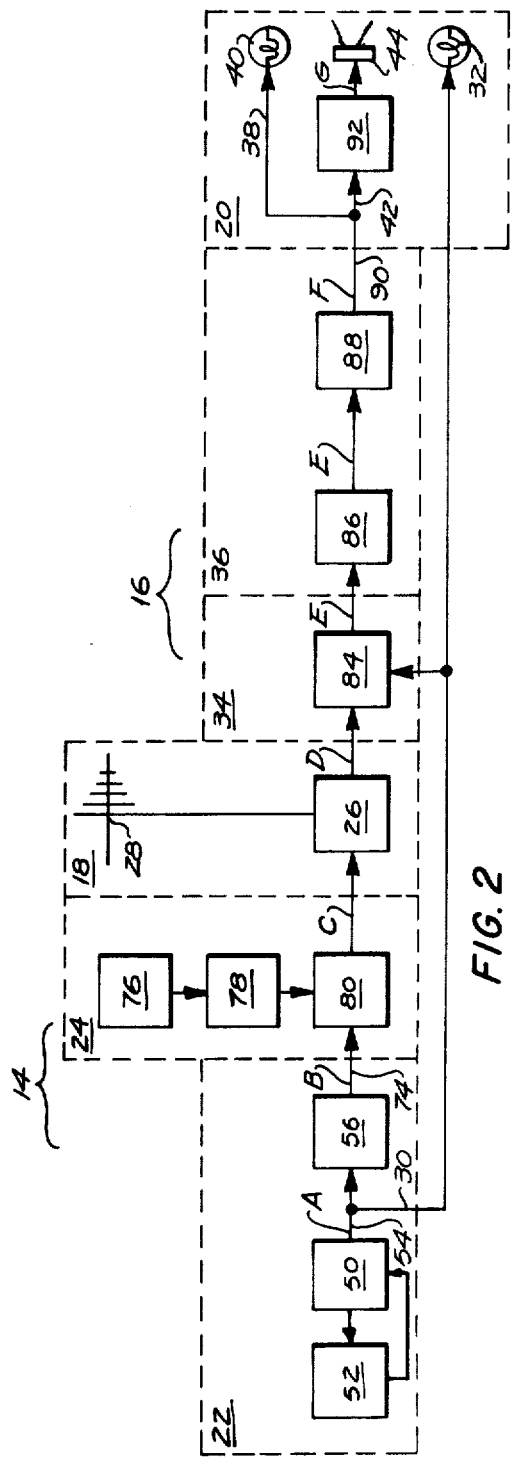

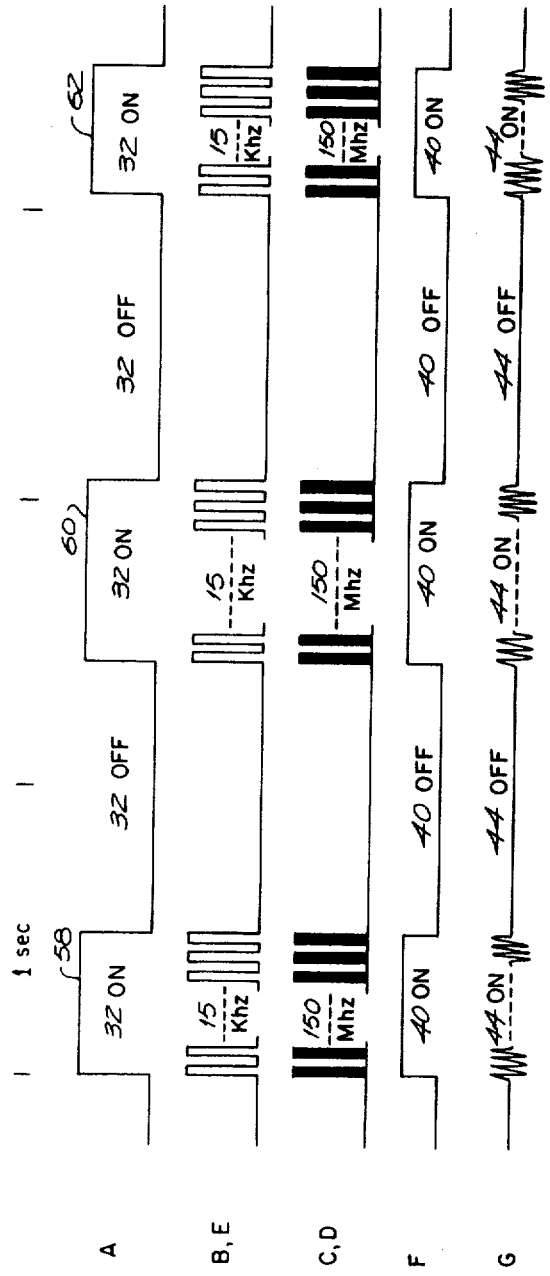
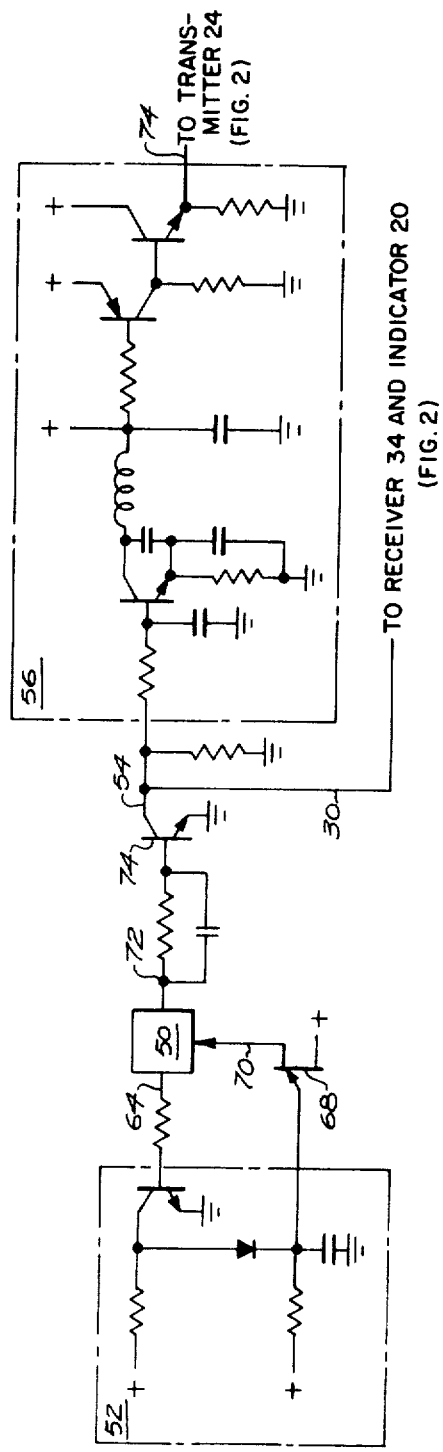
FIG. 3
FIG. 4
INVENTORS
MAX K. BARSH
JAMES N. EDWARDS
BY
Edward O. Ansell
ARTHUR DECKER
ATTORNEYS

VEHICLE ALERTING SYSTEM

BACKGROUND OF THE INVENTION

Incident to the ever-increasing use of the highways is the problem of communications, especially that directed to alerting the occupants of a moving vehicle to the presence in its vicinity of a vehicle in emergency service, which is entitled to pre-empt the use of the highway, so that the former may divert to provide a clear path for the latter. Systems have been proposed: some involve the use of plural permanently fixed installations of radio equipment along the roadsides, some involve computer-controlled telephone dial-up facilities, some, in recognition of the success of manufacturers to insulate the interiors of cars from outside noise, are responsive only to signals which may be heard in the immediate environs of a car and thus carry external microphones, emergency signal filters and other elaborate electronic devices, and still other depend upon complex roadway-monitoring central stations attended by traffic experts, a system with appreciable resemblance to the control towers at airports. Either outright rejection or considerable delay in the acceptance of the aforementioned systems is expected mainly because: (a) they all attack a plurality of problems incident to highway transportation, and (b) they require extensive and costly equipment installations on all roads used. In contradistinction, the equipment required by the present invention reside within the vehicles and are thus operative whenever the vehicle is operated and, additionally, may employ much of the equipment already in the vehicle for other purposes.

BRIEF SUMMARY OF THE INVENTION

The present invention is devoted particularly to the need for a warning device installed inside moving vehicles to alert its occupants of the approach and/or proximity of emergency vehicles. It discriminates from the high incident noise (or sound) level outside or within the vehicle, it operates regardless of how well sound-insulated the vehicle may be and it provides a warning of the presence of an emergency vehicle despite the overpowering, self-generated warning signals radiated by each.

The invention, in the preferred embodiment to be described here, comprises electronic equipment as follows: in each emergency vehicle, a modem, the transmitter of which is pulse-code modulated and the receiver of which is capable of being inhibited by the transmitter so as to be responsive only to signals generated outside and, in each passenger vehicle, a receiver responsive to any transmitter to energize an indicator.

The present system includes selected different transmitter interpulse periods with true statistical random turn-on and drift instability. Half-second transmitted pulses at low duty cycle provide random occurrence of gated modulation (15 Khz). This format, while nonoptimum from the viewpoint of communication efficiency, provides exceptional circuit simplicity. The received signal operates a visual indicator and keys an audible alarm signal. In each emergency vehicle, a second visual indicator monitors its transmitter and an inhibit signal cuts off its receiver when its transmitter is energized.

BRIEF DESCRIPTION OF THE DRAWINGS

FIG. 1 is a block diagram of a typical modem contemplated by the invention for installation in an emergency vehicle;

FIG. 2 is the detailed block diagram corresponding to FIG. 1;

FIG. 3 contains a set of waveshape graphs depicting the activity of the components of FIGS. 1 and 2; and FIG. 4 is the schematic diagram of encoder 22 of FIG. 1.

DESCRIPTION OF THE PREFERRED EMBODIMENT

In FIG. 1 is shown a sketch of emergency vehicle 10 containing modem 12, comprising transmitter section 14, receiver section 16, antenna section 18 and indicator section 20.

Transmitter section 14 includes encoder 22, which generates an output signal comprising a sequence, each sequence consisting of a series of pulses at, typically, 15 Khz for a period of one-half second, followed by an interstice of no output for a period of one second. It is pointed out that these rates are nominal only since it is inherent in the system of this invention that encoder 22 not be drift-free, and, further, that the mean duty cycles will be different for different vehicles. The signal from encoder 22 is fed to transmitter 24 which operates within the authorized radio band at, for instance 150 Khz. This signal is power amplified to a desired output power level by transmitter 24 and fed, in antenna section 18, to multiplexer 26 and thence to antenna 28. During intervals for which antenna 28 is excited, green lamp 32 in indicator section 20 is energized via line 30, thereby informing the operator of vehicle 10 that an emergency warning signal is being emitted by his own vehicle.

Any signal from another emergency vehicle in the vicinity is received in antenna section 18 by antenna 28 and directed by multiplexer 26 to receiver section 16.

In receiver section 16, receiver 34 detects the 150 Mhz carrier and passes the 15 Khz modulation to decoder 36 which filters, detects and amplifies it to energize a pair of alarms at indicator 20: via line 38, red lamp 40 and, via line 42, loudspeaker 44 with a 3 Khz audible tone from a local oscillator keyed on by the detection of the signal.

Reference is now made to the detailed block diagram corresponding to the system of the invention presented in FIG. 2 and the waveshapes indicative of its operation given in FIG. 3.

Encoder 22 of transmitter section 14 employs flip-flop 50, controlled by charging circuit 52, to provide, during about the initial half-second of every 1½ second period, a relatively high voltage level on line 54, which leads to line 30 and to 15 Khz, free-running, square-wave oscillator 56; this activity is shown by curve A in FIG. 3. It has been pointed out that no provision is made to control drift i.e., non-synchronous operation of encoder 22; thus, curve A shows first pulse 58 in synchronism but second pulse 60 with a leading edge somewhat early and a trailing edge later, and third pulse 62 with a leading edge somewhat late. As a result, oscillator 56 is gated on during the pulse periods, as shown by curve B.

A schematic diagram appropriate for encoder 22 is presented in FIG. 4, in which it is seen that, when output 64 of flip-flop 50 switches to a high voltage level, charging circuit 52 excites the emitter of transistor 68 to trigger input 70 of flip-flop 50 so that output 72 is at a high voltage level (waveshape A, FIG. 3). This, of course, drives transistor 74 which excites line 30, thereby cutting off receiver section 34 and energizing lamp 32 (green) in indicator section 20, and also causes oscillator 56 to generate a 15 Khz squarewave (waveshape B, FIG. 3) on line 74 to transmitter 24.

Returning to FIG. 2, transmitter 24 comprises oscillator 76, typically operating at 50 Mhz, the output of which is multiplied by tripler 78 to 150 Mhz and then fed to modulator 80 in which it is modulated by waveshape B to provide waveshape C on line 82. This signal is fed to multiplexer 26 (a transmit-receive switch or multicoupler) and to antenna 28.

Any incoming signal (waveshape D, FIG. 3) from another emergency vehicle is fed through antenna 28 and multiplexer 26 to receiver 34, which includes detector 84 or, optionally, input amplifier and filter. Detector 84, which is active only if line 30 is carrying no signal from encoder 22, removes the signal carrier (150 Mhz) to form waveshape E (FIG. 3). This is filtered in decoder 36 by 15 Khz narrow band filter 86 and then further demodulated by detector 88 to remove the 15 Khz portion and give waveshape F, on line 90, which feeds indicator section 20.

In indicator section 20, line 90 branches to lines 38 and 42, the former of which excites red lamp 40, thereby indicating that a signal is being received from another emergency vehicle, and the latter of which excites oscillator 92. Oscillator 92 comprises a 3 Khz generator which drives loudspeaker 44; thus, the presence of an emergency vehicle is indicated visually by red lamp 40 and aurally by loudspeaker 44.

It is appreciated that the above description has contemplated equipment as incorporated in an emergency vehicle, whereas the invention is directed to a system which contemplates equipment in ordinary passenger vehicles also. It should be apparent that the latter may comprise only antenna, receiver and indicator sections 18, 16 and 20, respectively, the first of which need not be provided with multiplexer 26, the second of which may omit the inhibit connection to detector 84 and the last of which may omit green lamp 32.

It should also be pointed out that the system of the invention may provide an indication of an emergency to pedestrians or to vehicles the emergency equipment of which are inactive or this may be accomplished simply by the addition in other receiving vehicles of indicators (such as lamp and/or loudspeaker 44) which would be apparent in the vicinity.

Further, in order not to encumber the description, portions of optional equipment have not been treated; thus, intensity and volume controls, power amplifiers, etc. are omitted. The necessity for these is felt to be a function of ordinary engineering decisions and their design is considered a result of skill-of-the-art effort.

What is claimed is:

1. In an alarm system for emergency vehicles, a plurality of transmitter sections, each said transmitter section comprising:
   an antenna;
   a transmitter connected to excite said antenna;
   signal generating encoder means for modulating said transmitter, said encoder means having a different duty cycle than, and being adapted to operate in non-synchronism with respect to the signal generating encoder means of any other transmitter section in said system.

2. The system of claim 1 wherein said encoders operate at different duty cycles.

3. The system of claim 1 and
   an indicator responsive to said encoder to indicate excitation of said transmitter and antenna.

4. The system of claim 1 and
   a receiver section responsive to the signals from the transmitter sections of other vehicles.

5. The system of claim 4 and
   an indicator responsive to excitation of said receiver section.

6. The system of claim 4 and
   means to cut off response to said receiver section during operation of said encoder.

7. The system of claim 4 and
   a multiplexer operative to provide selective operation of said antenna by said transmitter and said receiver section.

8. The system of claim 5 wherein said indicator operates both visual and aural outputs.

9. The system of claim 5 and
   second means also responsive to excitation of said receiver section to indicate outside of the vehicle.

10. An alarm system for a substantially enclosed area such as a vehicle, capable of indicating the presence of an emergency, adapted for use in a fleet comprising both emergency and receiving vehicles, said system comprising:
    in the receiving vehicle,
       an antenna,
       a receiver,
       a decoder and
       an indicator; and
    in each emergency vehicle,
       an antenna,
       a transmitter,
       a signal generating encoder means for modulating said transmitter, said encoder means having a different duty cycle than, and being adapted to operate in non-synchronism with respect to, the signal generating encoder means of any other transmitter section in any other emergency vehicle,
       a receiver,
       a decoder,
       means to inhibit operation of said emergency vehicle receiver when said emergency vehicle encoder is operated and
       means to multiplex said emergency vehicle antenna between said emergency vehicle transmitter and receiver.

* * * * *